Oct. 14, 1969  HERBERT-LUDWIG WIESMANN  3,472,549
HINGED BRACKET MEANS ADAPTED TO PIVOTALLY SUPPORT
A VISOR AND METHOD OF MAKING SAME
Filed Dec. 18, 1967  4 Sheets-Sheet 1
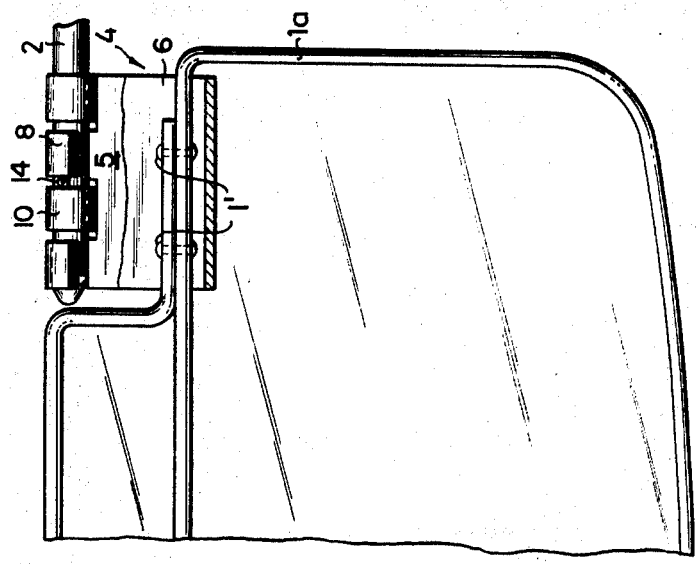
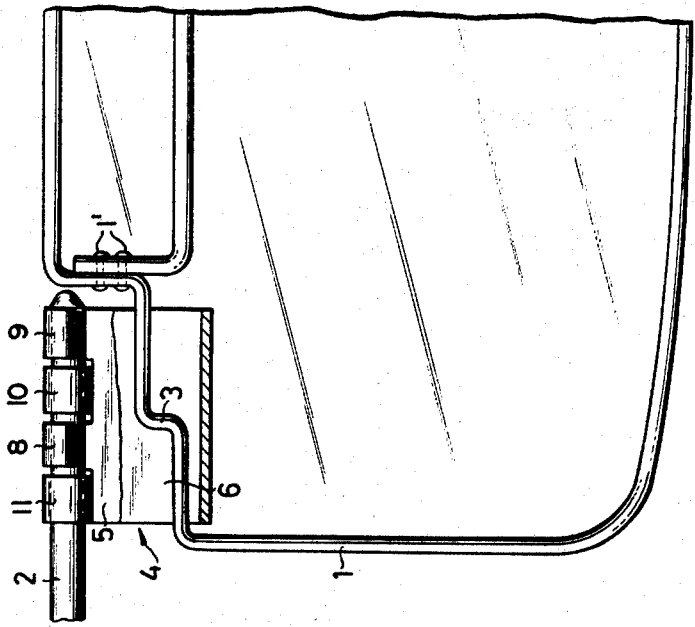
INVENTOR
HERBERT LUDWIG WIESMANN
BY
ATTORNEY

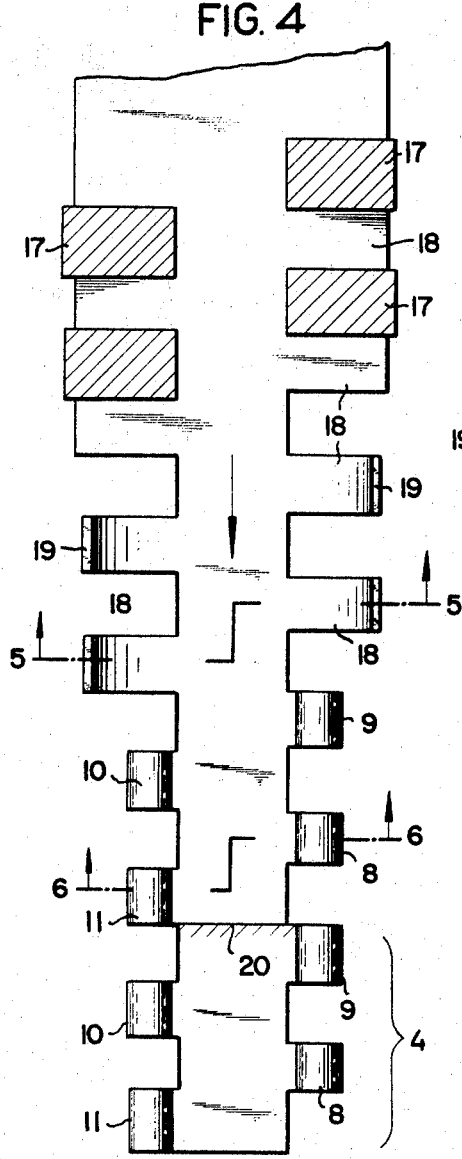
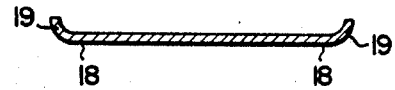
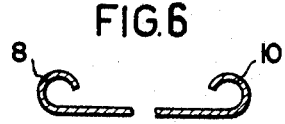

Oct. 14, 1969   HERBERT-LUDWIG WIESMANN   3,472,549
HINGED BRACKET MEANS ADAPTED TO PIVOTALLY SUPPORT
A VISOR AND METHOD OF MAKING SAME
Filed Dec. 18, 1967                     4 Sheets-Sheet 4
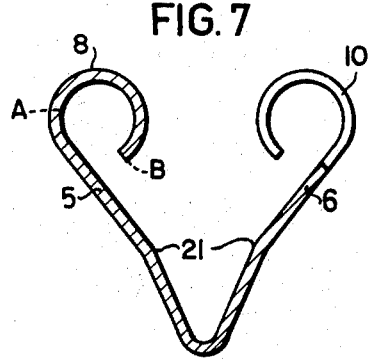
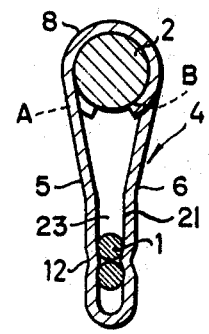
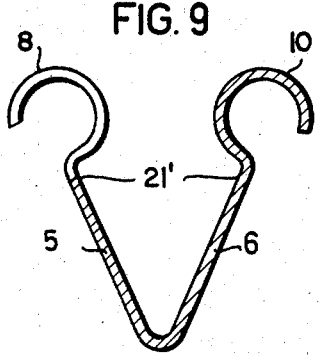
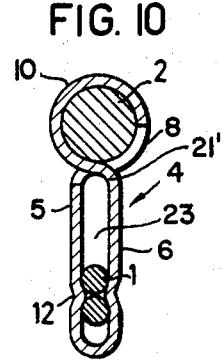
INVENTOR
HERBERT LUDWIG WIESMANN
BY *Abraham A. Saffitz*
ATTORNEY United States Patent Office 3,472,549
Patented Oct. 14, 1969

3,472,549
HINGED BRACKET MEANS ADAPTED TO PIVOTALLY SUPPORT A VISOR AND METHOD OF MAKING SAME
Herbert-Ludwig Wiesmann, Velbert, Germany, assignor to Stanley Works G.m.b.H., Velbert, Germany, a company of Germany
Filed Dec. 18, 1967, Ser. No. 691,443
Claims priority, application Germany, Dec. 24, 1966, 26,305
Int. Cl. B60j 3/02
U.S. Cl. 296—97    4 Claims

ABSTRACT OF THE DISCLOSURE

A U-shaped bracket is formed with a space between its legs. The free edge of each leg terminates in a plurality of tongues, each tongue curved into a tube formation, the tongues on one leg being staggered in relation to the tongues on the other leg, and the tongues on one leg being curved in the opposite direction from that of the tongues on the other leg. The tube formations are axially aligned to receive the support pin upon which the bracket swivels. A portion of the frame carrying the visor body is received within the space formed by the two legs of the bracket and an angular offset in the frame portion maintains a rigid connection between the assembled bracket and frame. In a modification, the frame portion has no offset, but the legs are deformed or dimpled to rigidly secure the frame and bracket.

Figure 3:
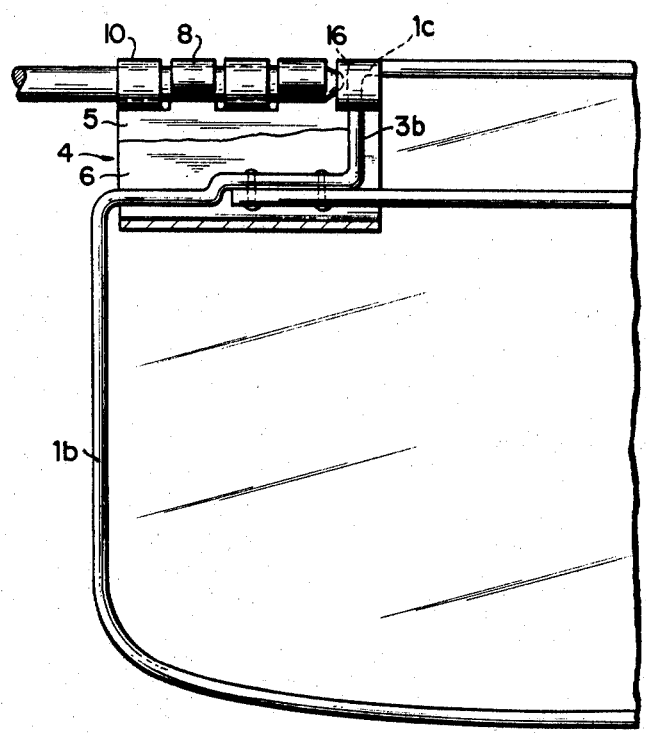

Another aspect of the invention is the method of forming the bracket. The steps comprise punching recesses along the edges of a stock strip to form tongues and curving the tongues to form tube-like formations. The direction in which the tongues on one edge are curved is opposite to the direction in which the tongues of the other edge are curved. A bracket blank of sufficient length is cut off from the formed strip and is bent along its longitudinal mid-axis to a U-formation. Thereafter, the legs of the U are further bent to cause axial alignment of the tube formations and to form the frame receiving space between the legs.

This invention relates to a bracket structure for pivotally securing an element to a rod support whereby swiveling movement of the element may be had. More particularly, the invention pertains to sun visors for motor vehicles, particularly to the bracket structure which pivotally mounts the visor body on the support rod means carried by the vehicle.

An object of this invention is to provide a bracket structure which comprises a unitary one-piece bracket having a visor clamping portion and a hinge portion.

Another object is to provide a hinge structure for pivotally supporting a bracket structure, the hinge structure being of the type wherein the hinge pin or rod is resiliently engaged by a series of axially aligned cylindrical tube or socket formations which are formed by curving tongue portions carried by the bracket adjacent tongues being curved in opposite directions. The tube formations resiliently engage the hinge rod and permit pivotal movement of the bracket with equal resistance in either direction.

Another object is to provide a visor bracket having a hinge portion of the type described above, whereby the visor may be moved pivotally with the same resistance in either direction and be resiliently held in the adjusted position.

Another object is to provide a one-piece U-shaped visor bracket wherein the visor frame is clamped between the legs of the U and the free ends of the legs of the U provide staggered tongues which are shaped to form aligned and resilient hinge rod receiving tube portions, the tongues on each leg curving in the opposite direction to provide balanced resistance to pivotal movement in either direction of visor swiveling.

Another object is to provide an efficient and economical method for fabricating the above one-piece bracket from strip material, in a continuous manner and on commercially available gang punch and forming machines.

Other objects and advantages of the invention will become apparent upon consideration of the following detailed specification describing several exemplary embodiments of the invention when read with reference to the attached drawing in which:

FIG. 1 shows the mounted bracket, partly in section, and the visor frame secured thereto;
FIG. 2 is similar to FIG. 1 but shows a different embodiment;
FIG. 3 shows a further embodiment, but is similar to FIG. 1;
FIGS. 4 to 8 show the several steps in the method for fabricating the hinge portion of the bracket, FIGS. 5 and 6 showing the shape of the work at the steps represented by lines 5—5 and 6—6, respectively, on FIG. 4; and,
FIGS. 9 and 10 are similar to FIGS. 7 and 8 but show a modification of the shaping steps represented by these figures.

Referring to FIG. 1, the visor body (not shown) which may be made of any conventional material, such as cardboard, plastic or a padded structure to prevent injuries, is carried by a frame 1. The frame may be made up of a single bar element shaped to form a rectangular support for the visor body, or may be portions made up of separate bar elements, spot welded together as shown at 1'.

Frame 1 is pivotally mounted on hinge pin or rod 2 by means of bracket 4. Rod 2 may be secured to a part of the vehicle in any conventional manner. As shown in FIGS. 8 and 10, bracket 4 comprises a U-shaped member having legs 5 and 6. FIGS. 1, 2 and 3 show leg 5 partially broken off. Frame 1 has an offset portion 3 which is clamped in space 23 formed between legs 5 and 6 (FIGS. 8 and 10). The bracket is pivotally supported on rod 2 by tube or socket formations 8 and 9 formed on the free end of leg 5 and tube formations 10 and 11 formed on the free end of leg 6. As will be noted from FIGS. 1, 7 and 8, tube formations 8 to 11 are cylindrically shaped and are axially aligned to fully engage rod 2. Bracket 4 is made of material which is resilient, such as spring steel, or may be made resilient after fabrication, so that tube formations 8 to 11 resiliently embrace rod 2. Thus, rod 2 and tube means 8 to 11 form a hinge means. It should also be noted that tube formations 8 and 9 are curved in the opposite direction from that of tube formations 10 and 11. This arrangement provides equal resistance to pivotal movement in either direction. While hinge construction comprising a rod and axially aligned tube formations carried by the visor has been used formerly in the art, all of the known tube formations curved in the same direction. This arrangement caused a binding effect or high resistance to pivotal movement in the direction of curvature and a low resistance in the opposite direction. In the prior art arrangement, the visor would not stay in its adjusted position under road vibrations. The improved novel arrangement of tube formations 8 to 11 eliminates the disadvantages of the prior art.

The offset 3 transfers visor adjusting forces from frame 1 to bracket 4 so that pivoting of the visor about rod 2 can take place. The offset 3 eliminates spot welding or other fastening means between the visor and the mounting means and results in a more economical method of assembly and in a stronger joint which is less prone to failure.

FIG. 2 shows a different embodiment. Frame 1a does not have offset 3, but as shown in FIGS. 8 and 10, the legs of bracket 4 are deformed or dimpled at points 12 to provide a good gripping and securing joint between the frame members and the bracket legs. In addition, rod 2 has a cam or detent formation 14 which may be a projection formed integrally with, or secured to, rod 2. Projection 14 is provided with a semi-spherical or similar cam-type surface and is located in the space between adjacent tube formations to hold the visor in an adjusted longitudinal position. In view of the semi-spherical surface of detent means 14, the tube formations can yield to permit the translational movement of the visor along rod 2 for longitudinal adjustment.

FIG. 3 is a further embodiment incorporating the frame features of FIGS. 1 and 2. Thus, an offset 3b is provided on the portion of the frame 1b lying within the legs of bracket 4 for the same cooperation therewith as explained in connection with offset 3 of FIG. 1. In order to increase the rigidity of frame 1b, casing member 16 encompasses a corner 1c of frame 1b and prevents distortion at that corner.

The visor may be supported by a single hinge bracket secured to one corner of its frame 1, as shown in the figures, or may be supported by two or more brackets spaced along the upper edge of frame 1. In the latter case, rod 2 would be extended the entire length of the visor to receive the several bracket means. The several brackets may also be supported by separate rod means mounted in alignment with the several brackets.

While bracket 4 may be fabricated by various methods, the following novel method is preferred as being the most economical and efficient mode of fabrication.

Referring to FIG. 4, a strip of suitable material such as resilient sheet steel, is fed within a gang punch and forming machine. Punches 17 are staggered as shown and strike-out portions in the strip which leave staggered struck-out tongues 18, 18 along the longitudinal edges of the strip. At the next station, a rolling tool initiates a curve formation 19 to the outer end of each tongue 18, as shown in FIG. 5. At the following station, a suitable die or similar forming tool completes the curving of tongues 18 to form tube or socket formations 8 to 11 with a diameter to yieldably receive hinge rod 2. As shown in FIGS. 7 and 8, the extent of the arc of curvature A–B of a tube formation is substantial and is in the neighborhood of about 270° so as to engage a substantial mating surface on rod 2, whereby an effective resilient support force is provided to permit the swiveling action of the visor and to retain the visor in its adjusted position.

At the next station, a cutting tool cuts off a bracket blank along line 20. The blank is thereafter bent along a mid longitudinal axis into the U-shaped formation, whereby legs 5 and 6 are formed which legs terminate in tube formations 8 to 11, as shown in FIGS. 7 to 10. A deformation at points 21 provides the space 23 in the formed and assembled bracket for the reception of frames 1, 1a or 1b. As shown in FIGS. 7 and 8, the tube formations 8 and 10 are curved in opposite directions but inwardly of the U formation.

FIGS. 9 and 10 show a modification in the tube formation portion of the bracket 4. Tube formations 8 and 10 are still curved outwardly in opposite directions but are curved outwardly of the U formation. The tube formations are offset at 21' whereby, in the assembly shown in FIG. 10, the space 23 is formed between legs 5 and 6 for the reception of frame 1, and the tube formations cross each other at 21' for axial alignment to receive hinge rod 2, whereby better resilient engagement is formed between rod 2 and the tube formations.

It is understood that the above-described arrangements are illustrative of the application of the principles of the invention. Numerous other arrangements may be devised by those skilled in the art without departing from the spirit and scope of the invention.

What is claimed is:

1. A mounting structure for a movable element comprising a supporting rod, a U-shaped bracket member having a base portion and two spaced legs extending therefrom thereby forming a space therebetween, tongues spaced along the free edge of one leg, each tongue curved in one direction to form a rod-receiving tube formation, tongues spaced along the free edge of the other leg in staggered relation to the tongues on the one leg and each tongue curved in the opposite direction to form a rod-receiving tube formation, the tube formations being in axial alignments to receive said support rod therebetween and thus pivotally support the bracket on the rod, a frame adapted to support a visor body and having a portion thereof located in the space between the legs, and means for preventing movement of said frame portion within said space in the bracket, thereby interlocking said frame and bracket for swiveling movement about said support rod.

2. The mounting structure of claim 1 wherein said last claimed means to prevent movement comprises an angular offset in the frame portion within the space in the bracket.

3. The mounting structure of claim 1 wherein the said last claimed means to prevent movement comprises a deformation in at least one of the legs at the region adjacent the frame portion to crimp the leg against the frame portion and thereby prevent the frame portion to move within said space.

4. A mounting structure as claimed in claim 1 and detent means to yieldably hold the bracket against longitudinal movement along the support rod, said detent means comprising a projection secured to said rod and having a cam surface to cooperate with the spaces between adjacent tube formations.

References Cited

UNITED STATES PATENTS

| 481,207 | 8/1892 | Smith | 29—11 |
| 3,378,297 | 4/1968 | Ternes | 296—97 |

LEO FRIAGLIA, Primary Examiner

JOHN A. PEKAR, Assistant Examiner

U.S. Cl. X.R.

29—11; 248—291